(12) United States Patent
Roelofs et al.

(10) Patent No.: US 8,000,215 B2
(45) Date of Patent: Aug. 16, 2011

(54) VOLTAGE PATTERN FOR FERROELECTRIC RECORDING HEAD

(75) Inventors: Andreas Karl Roelofs, Eden Prairie, MN (US); Tong Zhao, Eden Prairie, MN (US); Martin Gerard Forrester, Murrysville, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 182 days.

(21) Appl. No.: 12/539,880

(22) Filed: Aug. 12, 2009

(65) Prior Publication Data

US 2011/0038246 A1  Feb. 17, 2011

(51) Int. Cl.
*G11B 7/00* (2006.01)
(52) U.S. Cl. ........................................ 369/126
(58) Field of Classification Search ................ None
See application file for complete search history.

(56) References Cited

U.S. PATENT DOCUMENTS

| | | | |
|---|---|---|---|
| 7,876,662 B2 * | 1/2011 | Eleftheriou et al. | 369/126 |
| 2005/0128616 A1 | 6/2005 | Johns et al. | |
| 2006/0023606 A1 | 2/2006 | Lutwyche et al. | |
| 2007/0292652 A1 | 12/2007 | Strom et al. | |
| 2008/0225678 A1 * | 9/2008 | Ko et al. | 369/126 |
| 2009/0129247 A1 * | 5/2009 | Tran et al. | 369/126 |
| 2010/0085863 A1 * | 4/2010 | Franklin et al. | 369/126 |

OTHER PUBLICATIONS

A. Gruveman et al., "Nanoscale investigation of fatigue effects in Pb(Zr,Ti)O3 films," Appl. Phys. Lett 69 (21), Nov. 18, 1996, American Institute of Physics, pp. 3191-3193.
James F. Scott et al., "Ferroelectric Memories," Science, vol. 246, Dec. 15, 1989, pp. 1400-1405, downloaded from www.sciencemag.org on Aug. 12, 2009.
Nano-technology based Information & Energy Storage Research (NIES), "SPM-based data storage for ultrahigh density recording," Oct. 13, 2004, 35 pages.

* cited by examiner

*Primary Examiner* — Joseph Haley
(74) *Attorney, Agent, or Firm* — Hensley Kim & Holzer, LLC

(57) ABSTRACT

The presently disclosed technology teaches an improved voltage pattern for conductive tips utilized as moveable top electrodes for writing data bits into ferroelectric media. A conductive tip is dragged in contact or near contact with a ferroelectric surface forming a moveable top electrode on a ferroelectric media disk. A metallic film is deposited onto a bottom-side of the ferroelectric media forming a conductive bottom electrode. Applying electrical voltage pulses between the conductive tip and the bottom electrode induces polarization switching of the ferroelectric media under the head. The improved voltage pattern incorporates positive and negative overshoot voltages to induce a polarization switch in the ferroelectric media and positive and negative drag voltages to expand a polarized region on the ferroelectric media. Potential benefits of the improved voltage pattern include reduced cross-track blooming and reduced along-track blooming resulting in a more uniform track width and bit series length.

20 Claims, 7 Drawing Sheets

VOLTAGE PATTERN FOR FERROELECTRIC RECORDING HEAD

BACKGROUND

Increased storage capacity in digital disc recording technology has traditionally been addressed through improvements in the ability to store information on a particular storage disc with an increased areal density, e.g., by decreasing a size of the inductive write element and read back sensor in a magnetic recording system. Until recently, these prior art approaches have been adequate for increasing the storage capacity of magnetic recording discs. However, since a superparamagnetic effect limits the theoretical storage capacity of magnetic recording discs, other digital disc recording technologies (e.g., ferroelectric recording technology) are possible alternatives.

Typically in magnetic recording, magnetic vectors of ferromagnetic domains in a storage medium are arranged in a coherent manner to store bits of data. For example, if a vector direction between adjacent domains in reversed, a binary "1" can be stored. However, as the size of ferromagnetic domains in the storage medium are reduced in order to achieve higher packing densities, the anisotropic energy of the magnetic domains decreases. When the anisotropic energy of the ferromagnetic domains falls below what is known as the "superparamagnetic" limit, ambient thermal energy can overcome the magnetic anisotropy of the ferromagnetic domains and cause the magnetic domains to randomly reverse polarity. Therefore, it is not possible to store data on ferromagnetic domains below the "superparamagnetic" limit.

Ferroelectric materials (e.g. ferroelectric thin films) also have spatially localized domains representing individual bits of recorded data. However, with ferroelectric materials, the domains are formed by charged regions rather than magnetic vectors. More specifically, binary data in the form of polarization states can be stored in ferroelectric materials by utilizing one or more electrically conducting write tips as moveable top electrodes to store the data in the domains on the ferroelectric material. The polarization is preserved without the continued application of an external electric field. Since the "superparamagnetic" limit does not apply to ferroelectric recording, ferroelectric domains can be formed much smaller than magnetic domains and thus ferroelectric materials are capable of yielding much higher storage densities than comparable magnetic storage mediums.

A typical voltage pattern for writing bits into ferroelectric media may be characterized as a square wave, with alternating periods of positive voltage and negative voltage with magnitudes at least sufficient to induce polarization switching in the ferroelectric media. However, this voltage pattern suffers from cross-track blooming and along-track blooming problems on the ferroelectric media. As a result, it can be a challenge to maintain the size and location of small ferroelectric domains along a track of the ferroelectric media.

SUMMARY

In one implementation, bit length uniformity on cross-track and along-track axes of a ferroelectric storage medium is increased by applying an improved voltage pattern to write adjacent data bits on the ferroelectric storage medium. Applying electrical voltage pulses between a bottom electrode and a conductive tip reverses a polarization direction of the ferroelectric medium. Polarization within each ferroelectric domain on the ferroelectric medium can represent one bit of data (e.g., either a binary "1" or a binary "0").

The improved voltage pattern according to one implementation of the presently disclosed technology incorporates positive and negative overshoot voltages ($+V_o$, $-V_o$) at the beginning of a polarization switch and positive and negative drag voltages ($+V_d$, $-V_d$) to continue a polarization along a track of data being transferred to the ferroelectric medium. The overshoot voltages and drag voltages are taught herein to address the problems of cross-track blooming and along-track blooming on the ferroelectric medium. This improved voltage pattern yields a more uniform track width and bit series length for both long and short bit series.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. These and various other features and advantages will be apparent from a reading of the following detailed description.

BRIEF DESCRIPTION OF THE DRAWINGS

The described technology is best understood from the following Detailed Description describing various implementations read in connection with the accompanying drawings.

DETAILED DESCRIPTIONS

Figure 1A:
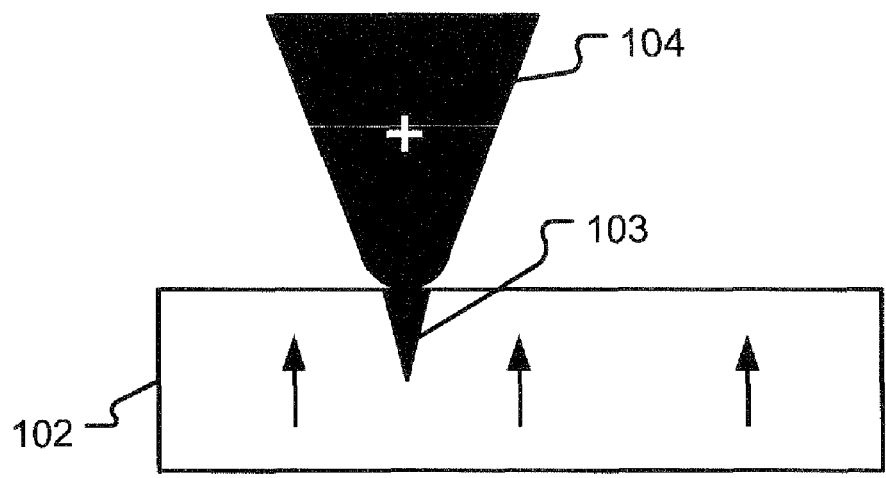
FIG. 1A illustrates an example positively charged conductive tip applying a nucleating voltage $V_n$ to switch a polarity of a ferroelectric film to create an opposite polarized nucleus.

The presently disclosed technology teaches an improved voltage pattern for conductive tips utilized as moveable top electrodes for writing bits into ferroelectric media. In a ferroelectric storage device, a head or conductive tip (e.g, a metal wire on a cantilever) serves as a moveable top electrode and is dragged in contact or near contact with a ferroelectric layer on a top-side of a ferroelectric medium. A metallic film is deposited onto a side of the ferroelectric layer opposite the top electrode and forms a conductive bottom electrode.

Applying electrical voltage pulses between the conductive tip and the bottom electrode induces polarization switching of the ferroelectric layer under the head or conductive tip.

When writing data bits into ferroelectric medium having a series of rows containing bit locations (e.g., a ferroelectric storage disc or an XY storage medium) using the conductive tip as a moveable top electrode, both width and length of individual written data bits are dependent upon how many bits are written in a row with the same polarization state. For a larger bit series (i.e., a row of bits having the same polarization state), a bit series width increases when compared to a bit series width of a smaller bit series. This is referred to herein as "cross-track blooming." Similarly, for a larger bit series, bit lengths at the ends of the bit series increase when compared to bit lengths at the ends of a smaller bit series. This is referred to herein as "along-track blooming." Similarly, after a larger bit series is written, bit lengths within a subsequent smaller bit series adjacent the larger bit series may decrease when compared to bit lengths within the larger bit series. The net result is non-uniform track width and bit length.

When employing ferroelectric thin film media for probe-based high-density data storage, it is important to achieve a substantially uniform track width and bit length. A non-uniform track width caused by cross-track blooming may lead to corruption and/or erasure of neighboring tracks. Further, a non-uniform bit size may cause variations in read signal magnitude which can complicate data analysis. Still further, along-track blooming may cause jitter in reading the data, increase the bit error rate, and/or cause an overall reduction in writeability/readability for ferroelectric thin film media, especially in high areal density applications.

Both the along-track blooming and the cross-track blooming cause writeability and readability problems on ferroelectric media as areal density increases. The problems are magnified on tracks with a rapidly changing combination of bit series, wherein each bit series is a row of adjacent bits having the same polarization state. For example, when a read back signal from a ferroelectric track with pseudo-random bit sequences (PRBS) having a minimum bit length of 100 nm is compared to a read back signal having a minimum bit length of 50 nm, the read back signal quality for the 50 nm signal is significantly more degraded. More specifically, the longer series of "1" or "0" in the 100 nm signal are well resolved. However, the more rapid alternations between "1" series and "0" series in the 50 nm signal have a reduced amplitude and/or increased baseline that fails to clearly differentiate between all the "1" and "0" bit series.

A cause of cross-track blooming and along-track blooming is that the voltage magnitude required to nucleate a domain under a conductive tip on a ferroelectric media (i.e., the nucleating voltage) is significantly greater than the voltage magnitude required to drag the domain wall along a data track after the initial domain is nucleated (i.e., the drag voltage). A reason that the voltage magnitude required to drag the domain wall through the ferroelectric film is less than nucleating a domain is that the drag voltage must only overcome any domain wall pinning to move the domain wall.

Non-ferroelectric inclusions in the volume of the ferroelectric media or dislocations in crystallographic structure of the ferroelectric media can cause domain wall pinning. Such inclusion or dislocation sites cause the domain wall to seat in a local energy minimum and an external field is required to "unpin" the domain wall from its pinned position. By decreasing the voltage applied to the conductive tip after a domain is nucleated, less energy is available to cause the undesirable effects of cross-track blooming and along-track blooming within the ferroelectric media.

An improved voltage pattern incorporating positive and negative overshoot voltages ($+V_o$, $-V_o$) at the beginning of a polarization switch and positive and negative drag voltages ($+V_d$, $-V_d$) to continue a polarization along a track of data being transferred to the ferroelectric media (see e.g., FIG. 2) is taught herein to address the problems of cross-track blooming and along-track blooming. This improved voltage pattern yields a more uniform track width and bit series length for both long and short bit series.

FIG. 1A illustrates an example positively charged conductive tip 104 applying a nucleating voltage $V_n$ to switch a polarity of a ferroelectric film 102 to create an opposite polarized nucleus 103. In the implementation of FIG. 1A, the ferroelectric film 102 is initially uniformly polarized (illustrated by "up arrows"). The positively charged conductive tip 104 is driving an opposite polarization through the ferroelectric film 102 to change the polarization of the ferroelectric film 102. The magnitude of the nucleating voltage is a voltage sufficient to create the opposite polarized nucleus 103 in an adjacent ferroelectric domain having an opposite polarity and drive the polarized nucleus 103 through a thickness of the ferroelectric film 102.

Figure 1B:
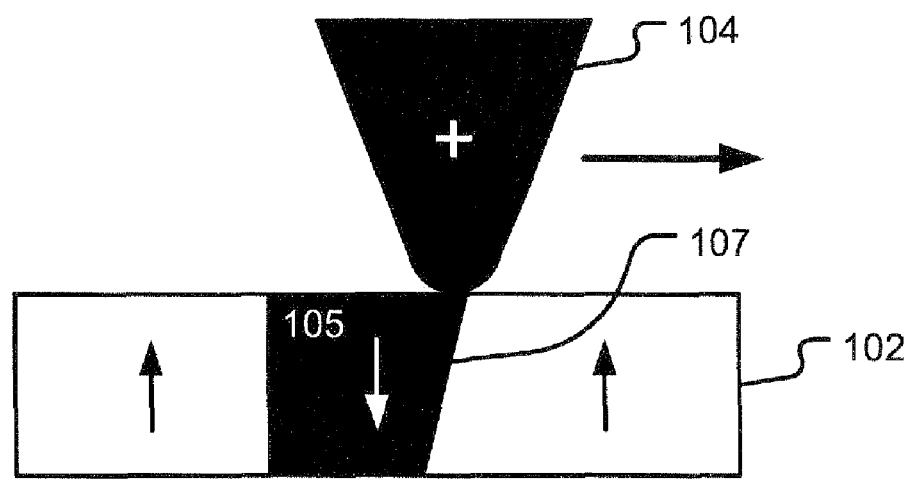
FIG. 1B illustrates an example positively charged conductive tip applying a drag voltage $V_d$ to switch a polarity of a ferroelectric film to expand a polarized domain.

FIG. 1B illustrates an example positively charged conductive tip 104 applying a drag voltage $V_d$ to switch a polarity of a ferroelectric film 102 to expand a polarized domain 105. In the implementation of FIG. 1B, the conductive tip 104 has already supplied a nucleating voltage to the ferroelectric film 102 and is dragging a domain wall 107 that defines a spatial limit of the polarized domain 105 (illustrated by the "down arrow")) in a left-to-right fashion using the drag voltage. In a three dimensional depiction, the domain wall 107 surrounds the polarized domain 105 on the ferroelectric film 102.

Figure 2:
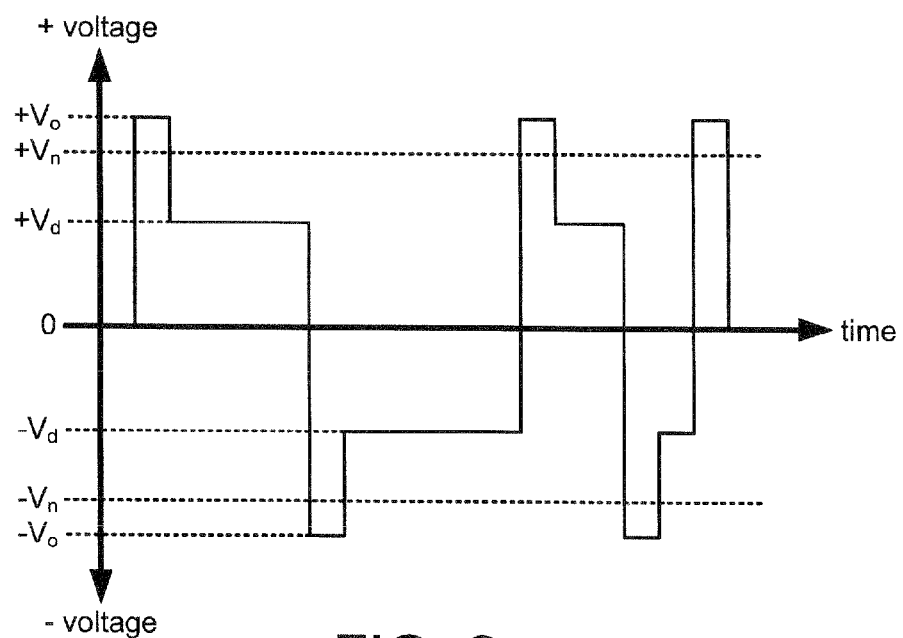
FIG. 2 illustrates an example improved voltage pattern for inducing polarity switching in a ferroelectric media according to the presently disclosed technology.

FIG. 2 illustrates an example improved voltage pattern for inducing polarity switching in a ferroelectric media according to the presently disclosed technology. Like a square wave according to the present state of the art, nucleation voltage levels ($+V_n$, $-V_n$) are defined as the minimum voltage necessary to induce switching in the ferroelectric media. The modified voltage pattern is similarly designed with overshoot voltage levels ($+V_o$, $-V_o$)) that slightly exceed the magnitude of the nucleation voltage levels to ensure that switching in the ferroelectric media is accomplished quickly and thoroughly.

However, after a bit series is nucleated using the nucleation voltage level, the remainder of the bit series is written to the ferroelectric media using drag voltage levels ($+V_d$, $-V_d$) that have a magnitude substantially less than the overshoot voltage levels and/or nucleation voltage levels. In various implementations, the drag voltage magnitude is 50%-75% of the nucleation voltage magnitude. Nucleation of a bit series may take a time corresponding to a fraction of one bit or an entire bit, depending on a number of factors including, sizes of surrounding bit series, a size of the bit series to be written to the ferroelectric media, and properties/type of ferroelectric media to be written to.

The drag voltage levels have only sufficient magnitude to drag the domain wall surrounding the bit series, not nucleate new polarized regions on the ferroelectric media. By reducing the voltage applied to the ferroelectric media to drag voltage levels, excess power applied to the ferroelectric media in a typical square voltage pattern that causes cross-track blooming and along-track blooming is reduced or eliminated. The energy required for creating the nucleus for each bit series is quantified by the coercive field and may be measured through ferroelectric measurements. The energy required to drag the domainwall may be measured through scan-stand and/or piezo force module (PFM) measurements.

While a step function voltage pattern is specifically taught in FIG. 2, a variety of improved voltage patterns are contemplated as alternatives to the square wave voltage patterns of the current state of the art. For example, after a bit series is nucleated in a ferroelectric media, the dragging voltage may decrease linearly, or non-linearly; uniformly, or non-uniformly over time to one or more levels that have less magnitude than the overshoot voltage. These improved voltage patterns may be specifically designed to make compensation for cross-track blooming and along-track blooming more precise.

Figure 3A:
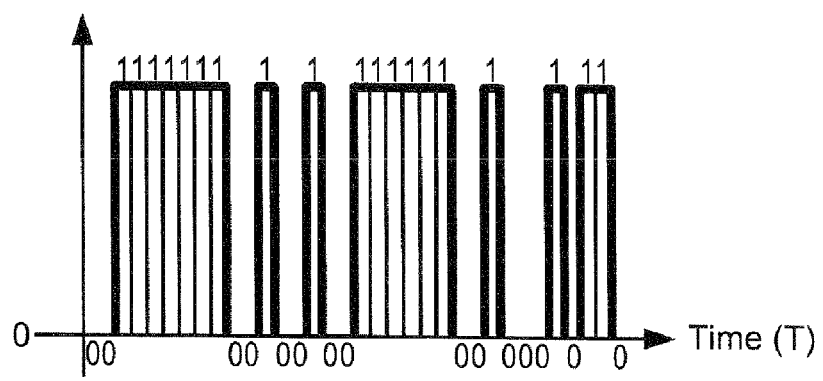
FIG. 3A illustrates a pseudo-random bit sequence (PRBS) that may be written to a ferroelectric track using either a conventional voltage pattern or an improved voltage pattern.

FIG. 3A illustrates a pseudo-random bit sequence (PRBS) that may be written to a ferroelectric track using either a conventional voltage pattern or an improved voltage pattern. The PRBS is a digital sequence of zeros and ones that has a pattern "0 0 1 1 1 1 1 1 1 0 0 1 0 0 1 0 0 1 1 1 1 1 1 0 0 1 0 0 0 1 0 1 1 0" written over time (T).

Figure 3B:
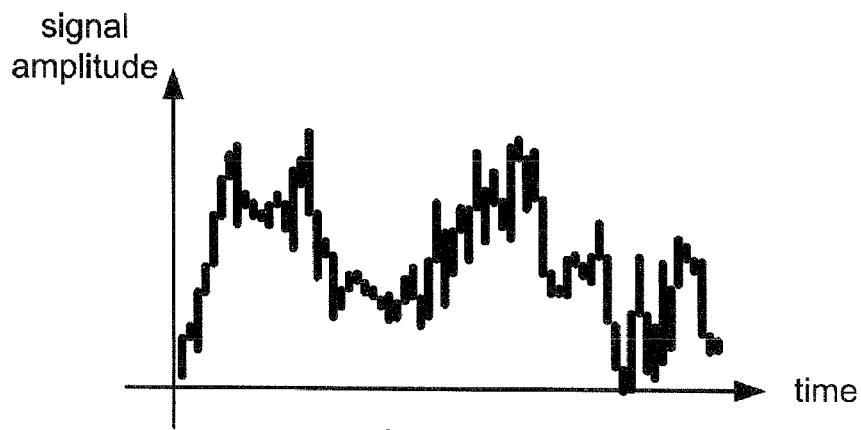
FIG. 3B illustrates an example read back signal from a ferroelectric track written with the PBRS of FIG. 3A using a conventional square voltage pattern.

FIG. 3B illustrates an example read back signal from a ferroelectric track written with the PBRS of FIG. 3A using a conventional square voltage pattern. While the read back signal of FIG. 3B has sufficient peaks and valleys to distinguish longer bit series, there is not sufficient resolution with the standard voltage pattern to clearly identify shorter bit series. Shorter bit series are significantly affected by significant inter-symbol interference. The read back signal of FIG. 3B has a fundamental bit length of 50 nm, however, the resolution of FIG. 3B only allows a minimum of approximately 150 nm bit lengths to be accurately identified due at least in part to inter-symbol interference.

Figure 3C:
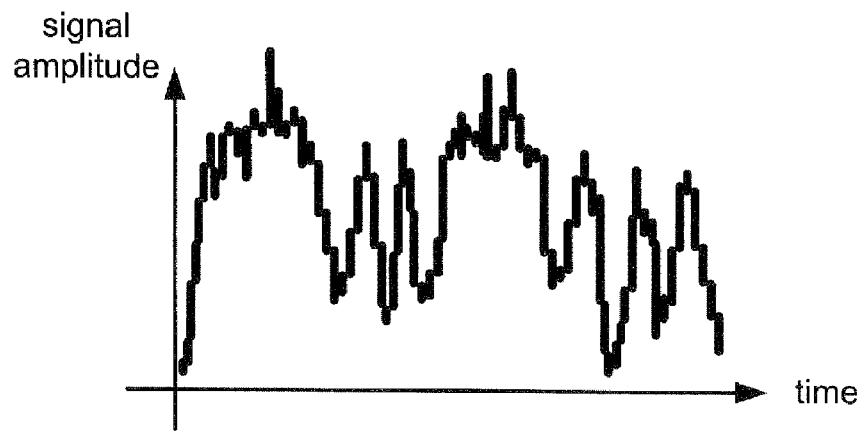
FIG. 3C illustrates an example read back signal from a ferroelectric track written with the PBRS of FIG. 3A using an improved voltage pattern.

FIG. 3C illustrates an example read back signal from a ferroelectric track written with the PBRS of FIG. 3A using an improved voltage pattern. A clear improvement in inter-symbol interference is found when using the improved voltage pattern. Both longer bit series and shorter bit series are better resolved using the improved voltage pattern. More specifically, the read back signal from longer bit series has a more uniform magnitude across a length of the longer bit series. Further, shorter bit series that failed to register a read back signal from data written using the conventional square voltage pattern (see FIG. 3B) appear in the read back signal from data written using the improved voltage pattern taught herein.

Figure 4:
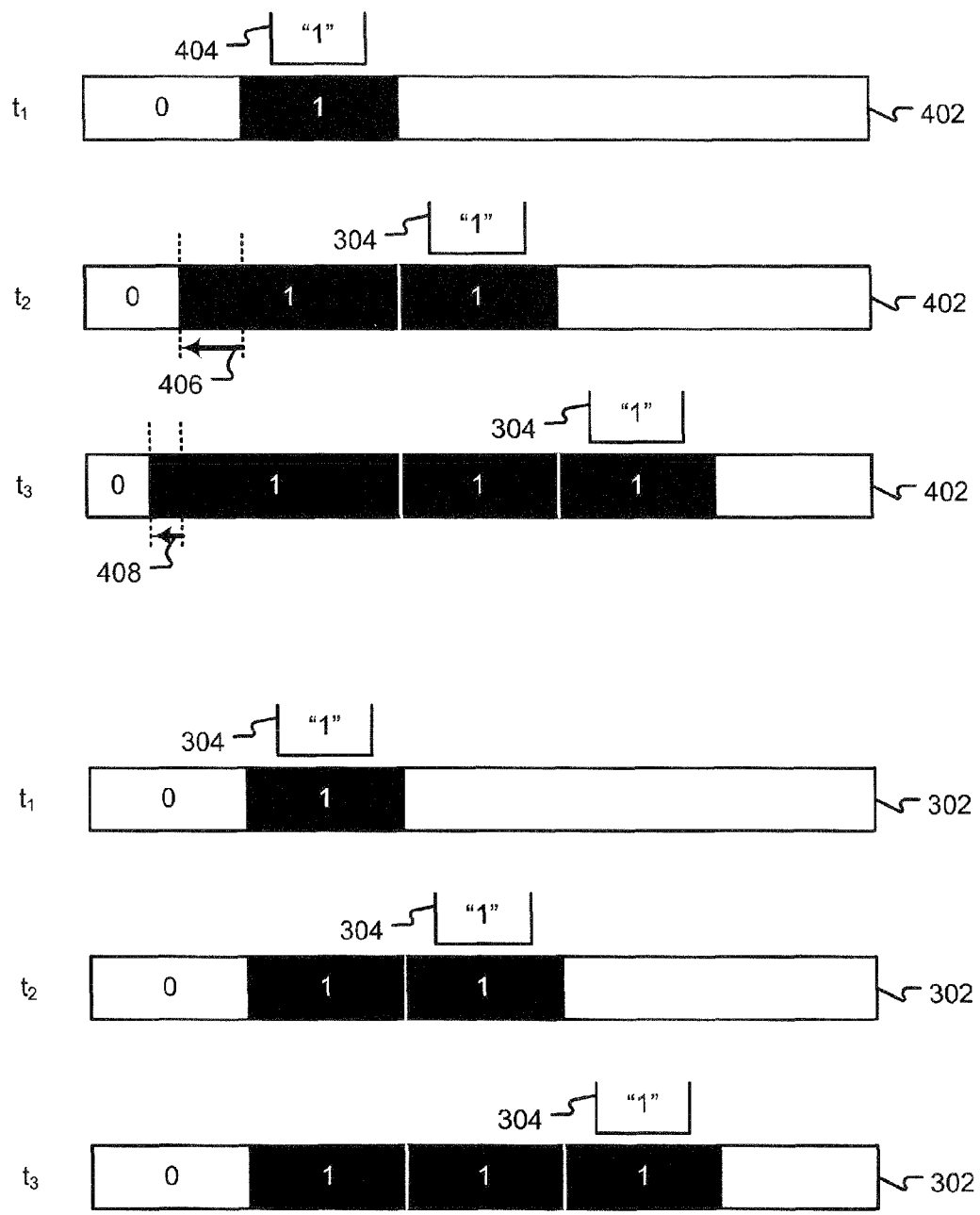
FIG. 4 illustrates an example of how the modified voltage pattern disclosed herein may reduce along-track blooming on a ferroelectric media.

FIG. 4 illustrates an example of how the modified voltage pattern disclosed herein may reduce along-track blooming on a ferroelectric media 402. The implementation of FIG. 4 uses a series of three bits in a "1 1 1" pattern written immediately following a "0" bit at times $t_1$, $t_2$, and $t_3$ respectively. The top three illustrations represent application of a conventional square voltage pattern to the ferroelectric media 402 at times $t_1$, $t_2$, and $t_3$. At $t_1$, a voltage state of a conductive tip 404 is set to "1" and a region of the ferroelectric media 402 under the conductive tip 404 becomes a polarized "1" bit. This region is larger than the contact area of the conductive tip 404 due to a fringing field pushing the polarized area boundaries outward in along-track directions.

As the conductive tip 404 moves to the right, the fringing field moves with the conductive tip 404 and causes a polarization shift in the ferroelectric media 402 to precede the position of the conductive tip 404. Further, the fringing field also pushes a boundary between the first "0" bit and the first "1" bit to the left, illustrated by arrow 406 at $t_2$. As the conductive tip 404 moves further away from the boundary between the first "0" bit and the first "1" bit, the effect of the fringing field on the boundary between the first "0" bit and the first "1" bit decreases as illustrated by the smaller arrow 408 at $t_3$. As a result, the first "0" bit has a significantly smaller size at $t_3$ than $t_1$.

The bottom three illustrations represent application of a modified voltage pattern according to the presently disclosed technology to the ferroelectric media 402 at times $t_1$, $t_2$, and $t_3$. At $t_1$, a voltage state of a conductive tip 404 is set to "1" and a region of the ferroelectric media 402 under the conductive tip 404 becomes a polarized "1" bit. As the conductive tip 404 moves to the right, the voltage magnitude of the conductive tip 404 is reduced to a drag voltage magnitude. Thus, at $t_2$ and $t_3$, the aforementioned effect of the fringing field moving the boundary between the first "0" bit and the first "1" bit is significantly reduced or eliminated.

Figure 5:
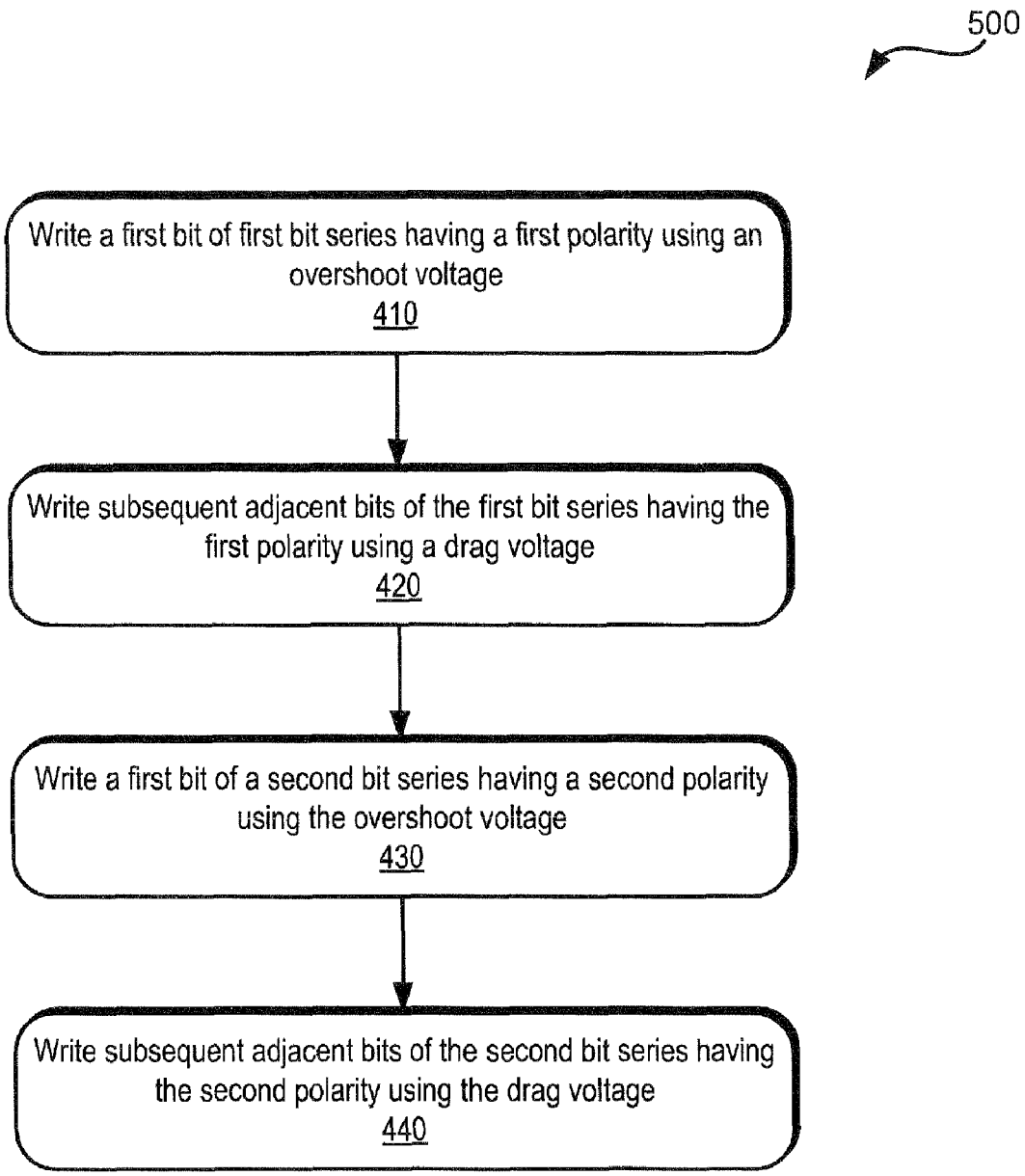
FIG. 5 is a flow chart illustrating example operations for writing two adjacent bit series along a track of a continuous ferroelectric storage medium according to the presently disclosed technology.

FIG. 5 is a flow chart illustrating example operations for writing two adjacent bit series along a track of a continuous ferroelectric storage medium according to the presently disclosed technology. As discussed in detail above, the presently disclosed technology utilizes an improved voltage pattern for writing bits to ferroelectric storage media. The improved voltage pattern has an "overshoot voltage" magnitude to nucleate a polarized region within the ferroelectric storage media and a "drag voltage" to move domain walls of the polarized region to incorporate additional bits. In the example operations of FIG. 5, the two adjacent bit series have opposite polarity (e.g., up/down, positive/negative, and 0/1).

A first bit of a first bit series having a first polarity is written to the ferroelectric storage media using the overshoot voltage 510. While the overshoot voltage is at least equal to a voltage required to nucleate the polarized region (i.e., a nucleation voltage) within the ferroelectric storage media, the overshoot voltage may be greater than the nucleation voltage to ensure that the first bit is written quickly and accurately to the ferroelectric storage media. Subsequent bits of the first bit series having the first polarity are then written to the ferroelectric storage media using the drag voltage 520. In one implementation, the drag voltage is substantially smaller in magnitude than the overshoot voltage. In another implementation, the drag voltage is substantially smaller in magnitude than the nucleation voltage.

Once all the bits of the first bit series are written to the ferroelectric media, a first bit of a second bit series having a second polarity is written to the ferroelectric storage media using the overshoot voltage 530. Subsequent bits of the second bit series having the second polarity are then written to the ferroelectric storage media using the drag voltage 540. The example operations of FIG. 5 may be repeated to write additional bit series to the ferroelectric storage media.

Figure 6:
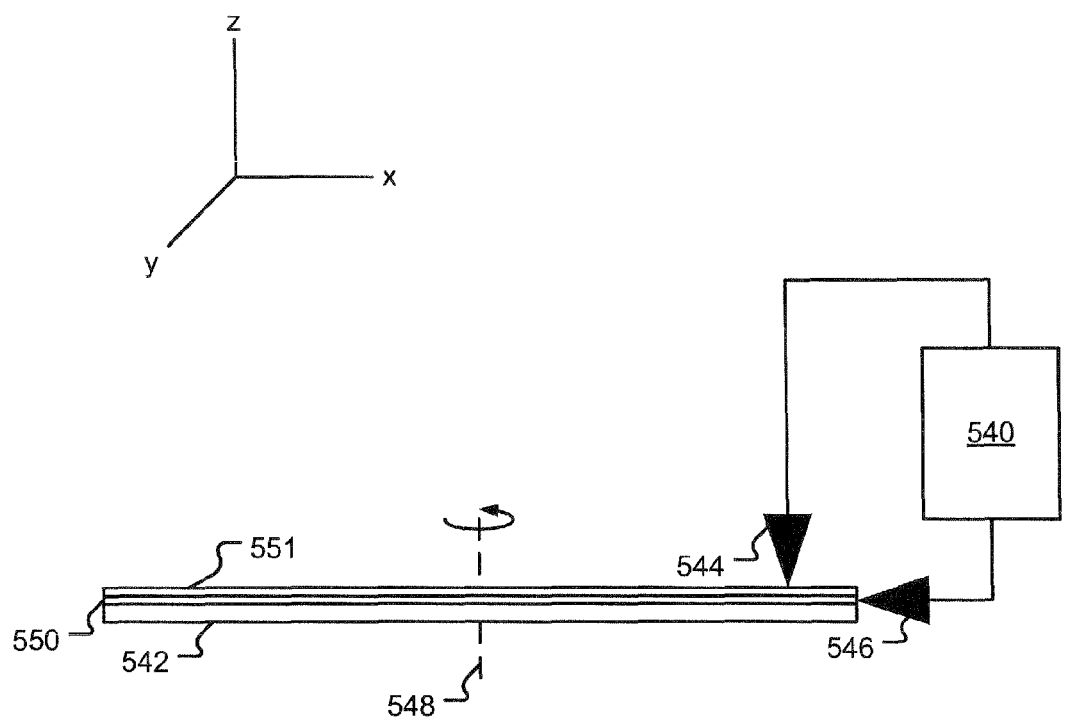
FIG. 6 illustrates an example voltage source configured to apply a voltage pattern according to the presently disclosed technology to a ferroelectric disk.

FIG. 6 illustrates an example voltage source 640 configured to apply a voltage pattern according to the presently disclosed technology to a rotating ferroelectric disk 642. A ferroelectric layer 651 is mounted on top of a conductive film 650, which in turn is mounted on top of the ferroelectric disk 642. The voltage source 640 is configured to deliver a voltage polarity and magnitude according to a modified voltage pattern as discussed in detail above.

The voltage polarity is transferred to the ferroelectric layer 651 by applying a voltage between a first electrode 644 in contact or near contact with the ferroelectric layer 651 and a second electrode 646 in contact or near contact with the conductive film 650. The ferroelectric disk 642 may be configured to rotate about an axis 648 oriented in a z-direction while the first electrode 644 and/or the second electrode 646 do not rotate. Further, the first electrode 644 may move to change its relative position with respect to the ferroelectric disk 642. For example, the first electrode 644 may move in an x-direction to change tracks on the ferroelectric disk 642.

In one implementation, one or more heads on the ferroelectric disk include the first and/or second electrodes 644, 646. Further, the ferroelectric disc may include one or more layers of conductive film 650. The heads are polarized in order to store binary data in the ferroelectric disk by applying a switching voltage to a ferroelectric capacitor that in turn applies the polarization to the ferroelectric layer 651 of the ferroelectric disc. The heads act as moveable top electrodes to store the data in domains within the ferroelectric layer 651. The presently disclosed technology may also be applied to a stationary planar ferroelectric media that does not rotate.

In a commercially available XY scanner implementation, the first electrode 644 is moveable in two directions (e.g., x-direction and y-direction) to access the entire planar ferroelectric media. The first electrode 644 may take a form similar to commercially available XY scanners. For example, the first electrode 644 is slideably attached to a first rail oriented in the x-direction. The first rail is slideably attached to a second rail oriented in the y-direction. The second rail is secured to the planar ferroelectric media. In operation, sliding the first rail along the second rail adjusts the y-position of the first electrode 644 and sliding the first electrode 644 along the first rail adjusts the x-position of the first electrode 644. In other implementations, the ferroelectric media is curved and the first rail and second rail are similarly curved to maintain a desired distance (or pressure if the distance is zero) between the first electrode 644 and the ferroelectric media.

Figure 7:
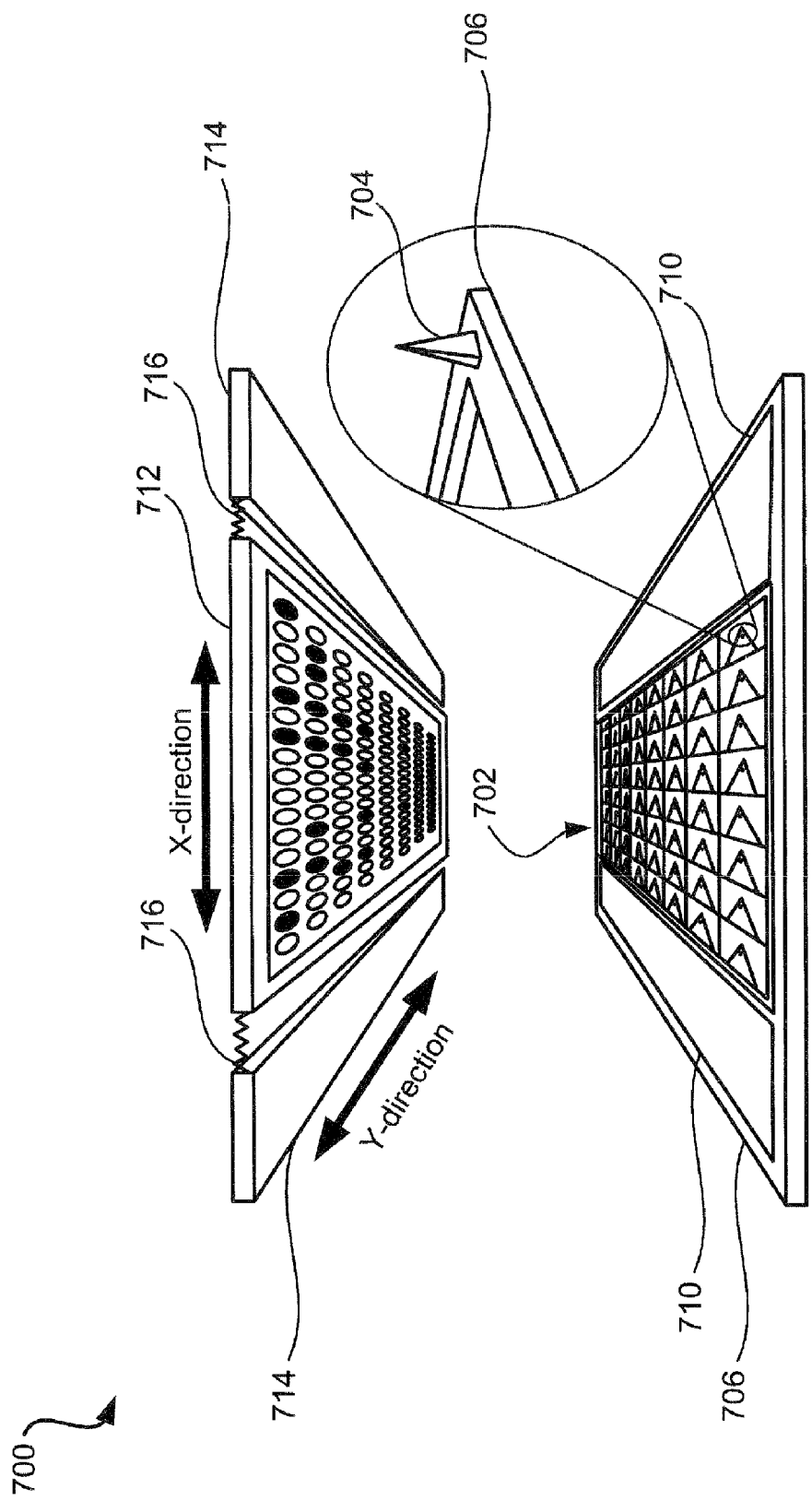
FIG. 7 illustrates an example planar XY ferroelectric storage medium.

FIG. 7 illustrates an example planar XY ferroelectric storage medium 700. A ferroelectric media sled 712 includes an array of ferroelectric bits having either "on" or "off" positions (illustrated as either white or black ovals). The ferroelectric media sled 712 is attached to a ferroelectric media frame 714 with actuators 716. The actuators 716 are configured to move the ferroelectric media sled 712 with respect to the ferroelectric media frame 714 in both x and y directions. The actuators 716 may also include springs and/or dampeners to achieve a desired operation of the actuators 716.

The ferroelectric media frame 714 is attached to an electrode frame 706 that contains an electrode array 702 and electronics 710. The electronics 710 control the actuators 716 to move the ferroelectric media sled 712 in x and y directions with respect to the electrode frame 706 so that desired ferroelectric bits align with desired electrodes 704. The electronics 710 then charge the desired electrode(s) 704 to change the polarity of the desired ferroelectric bits using the improved voltage pattern disclosed herein. The electrode frame 706 and the ferroelectric media frame 714 are shown detached from one another and with significant space between for illustration purposes only. In operation, the electrode frame 706 and the ferroelectric media frame 714 are one in the same or fixably attached to one another.

The above specification and examples provide a complete description of the structures of exemplary implementations of methods and apparatus that may be used for data storage using ferroelectric, recording heads. Although various implementations of the methods and apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. The implementations described above and other implementations are within the scope of the following claims.

What is claimed:

1. A method of writing adjacent data bits along a track of a continuous ferroelectric storage medium, the method comprising:
    writing a first data bit to the continuous ferroelectric storage medium, wherein the first data bit has a first polarity;
    writing a second data bit to the continuous ferroelectric storage medium, wherein the second data bit has an opposite polarity to the first polarity and is written using a voltage equal to or greater than a nucleation voltage;
    writing a third data bit to the continuous ferroelectric storage medium, wherein the third data bit has the opposite polarity to the first polarity and is written using a voltage having a smaller magnitude than the nucleation voltage.

2. The method of claim 1, wherein the nucleation voltage has a magnitude at least sufficient to create and drive an oppositely charged nucleus through a thickness of the continuous ferroelectric storage medium.

3. The method of claim 1, wherein the voltage having a smaller magnitude than the nucleation voltage is a drag voltage.

4. The method of claim 3, wherein the drag voltage has a magnitude at least sufficient to move a domain wall surrounding a charged nucleus on the continuous ferroelectric storage medium.

5. The method of claim 1, wherein the continuous ferroelectric storage medium includes a bottom electrode and the writing operations are performed by interaction between a moveable top electrode and the bottom electrode.

6. The method of claim 1, wherein one or more of the first data bit, second data bit, and third data bit consists of a partial data bit or one entire data bit with the same polarity.

7. A method of writing a data bit adjacent a previously written data bit along a track of a continuous ferroelectric storage medium, the method comprising:
    writing the data bit using an overshoot voltage if the previously written data bit has an opposite polarity from the data bit; and
    writing the data bit using a drag voltage if the previously written data bit has the same polarity of the data bit.

8. The method of claim 7, wherein the overshoot voltage is equal to or greater than a nucleation voltage.

9. The method of claim 8, wherein the nucleation voltage has a magnitude at least sufficient to create and drive an oppositely charged nucleus through a thickness of the continuous ferroelectric storage medium.

10. The method of claim 7, wherein the drag voltage has a magnitude at least sufficient to move a domain wall surrounding a charged nucleus on the continuous ferroelectric storage medium.

11. The method of claim 7, wherein the continuous ferroelectric storage medium includes a bottom electrode and the writing operations are performed by interaction between a moveable top electrode and the bottom electrode.

12. The method of claim 7, wherein the data bit consists of a partial data bit or one entire data bit with the same polarity.

13. A system for writing adjacent data bits along a track of a continuous ferroelectric storage medium, the system comprising:
    a voltage source that supplies a first voltage to write a first data bit to the continuous ferroelectric storage medium, a second overshoot voltage with an opposite polarity from the first voltage to write a second data bit to the continuous ferroelectric storage medium, and a third drag voltage with the opposite polarity from the first voltage to write a third data bit to the continuous ferroelectric storage medium, wherein the third drag voltage has a smaller magnitude than the second overshoot voltage; and a pair of electrodes that applies the first voltage, second voltage, and third voltage to write the adjacent data bits to the continuous ferroelectric storage medium.

14. The system of claim 13, wherein the second overshoot voltage has a magnitude equal to or greater than a nucleation voltage.

15. The system of claim 14, wherein the nucleation voltage has a magnitude at least sufficient to create and drive an oppositely charged nucleus through a thickness of the continuous ferroelectric storage medium.

16. The system of claim 13, wherein each of the first data bit, second data bit, and third data bit may consist of a partial data bit or one entire data bit with the same polarity.

17. The system of claim 13, wherein the voltage source uses a step-function voltage pattern to apply the first voltage, second overshoot voltage, and third drag voltage to the pair of electrodes.

18. The system of claim 13, wherein the voltage source uses a non-linear voltage pattern to apply the first voltage, second overshoot voltage, and third drag voltage to the pair of electrodes.

19. The system of claim 13, wherein the continuous ferroelectric storage medium comprises a ferroelectric film on a rotating disc, wherein one of the pair of electrodes is moveable along one axis with respect to the rotating disc.

20. The system of claim 13, wherein the continuous ferroelectric storage medium comprises a ferroelectric film on a stationary media, wherein one of the pair of electrodes is moveable along two axes with respect to the stationary media.

* * * * *